Dec. 7, 1954  F. CROSS  2,696,143
AIRCRAFT AND GUN INSTALLATIONS THEREFOR
Filed Feb. 13, 1951  4 Sheets-Sheet 1
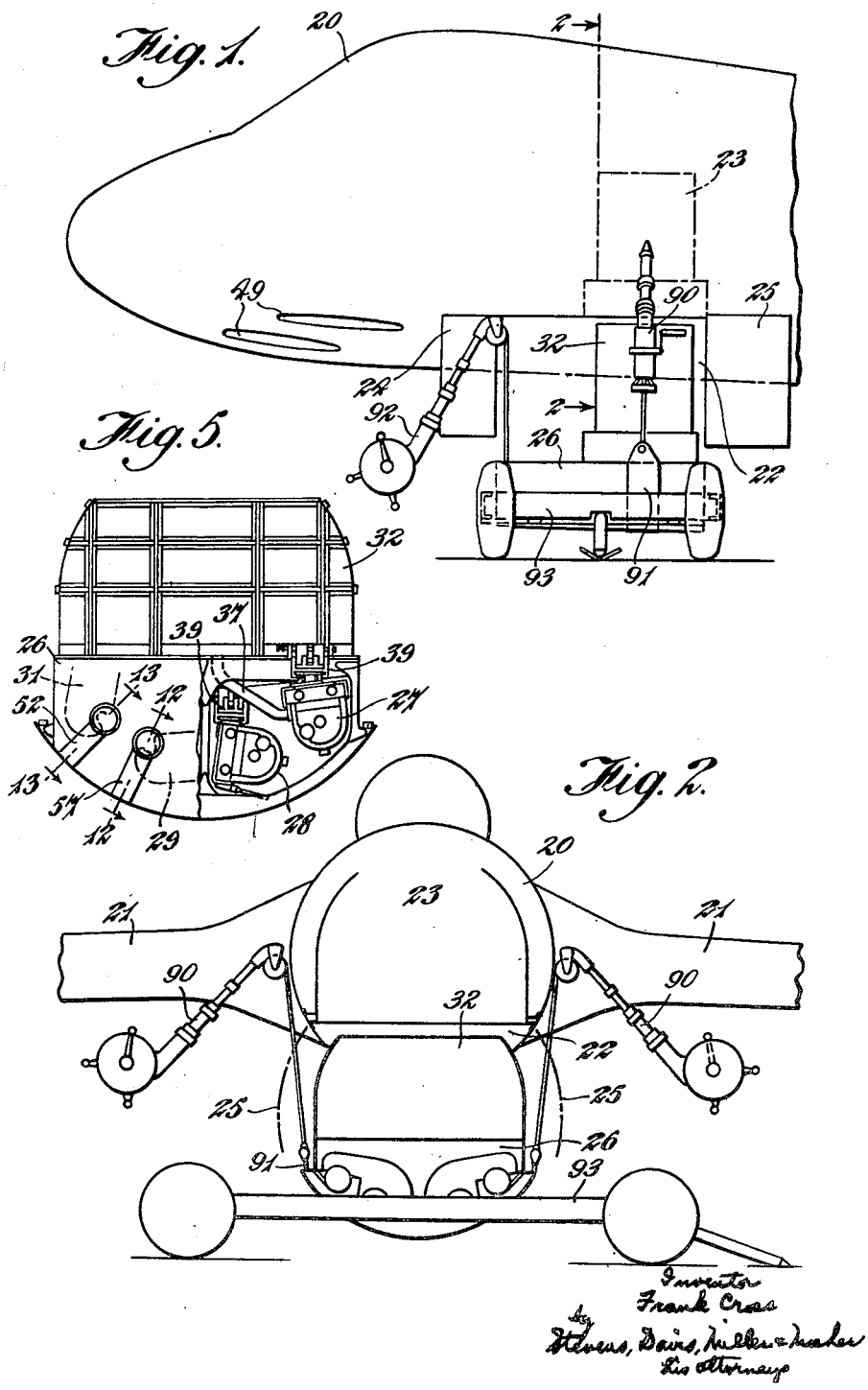
Inventor
Frank Cross
by Stevens, Davis, Miller & Mosher
His Attorneys

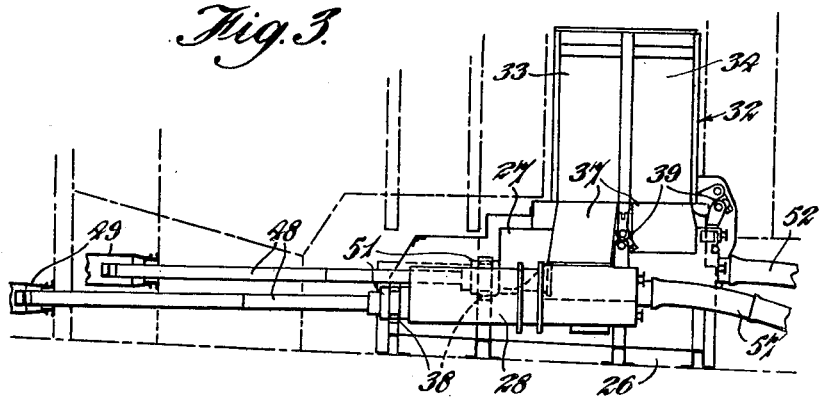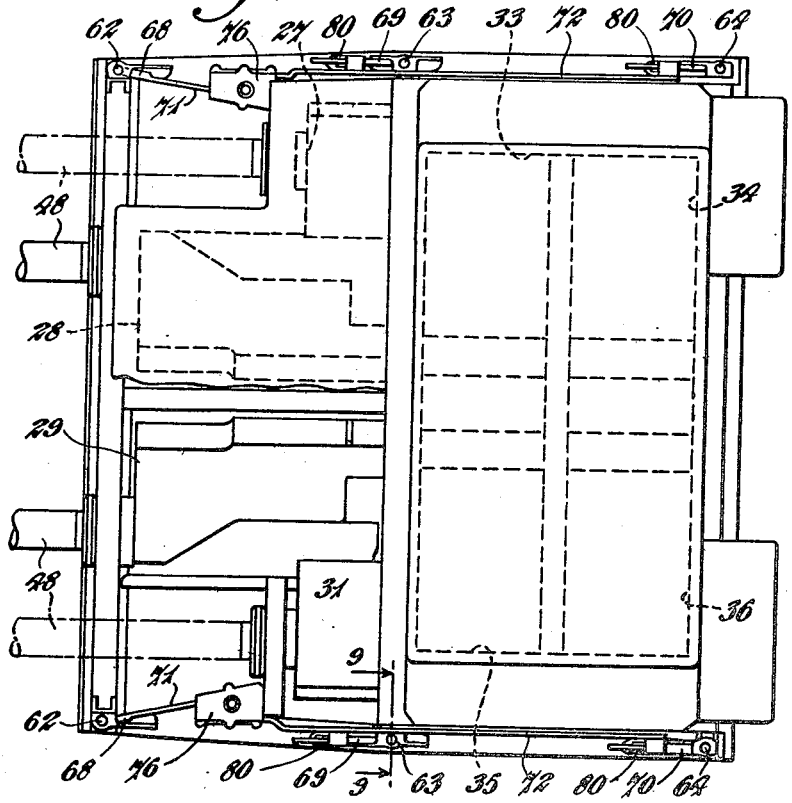

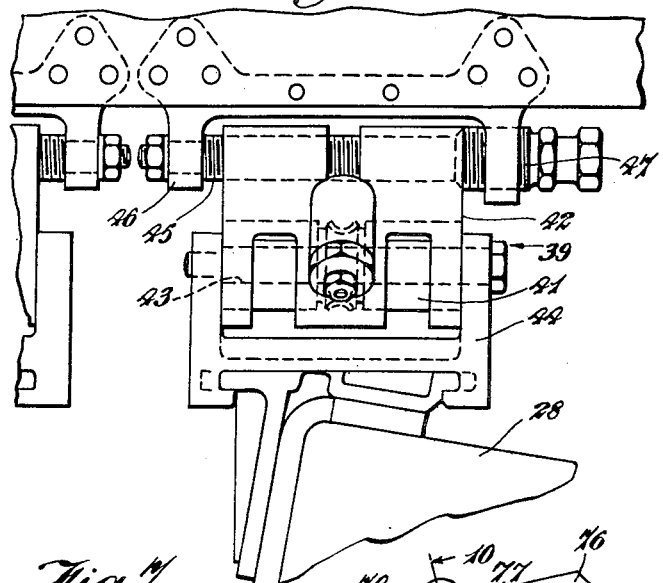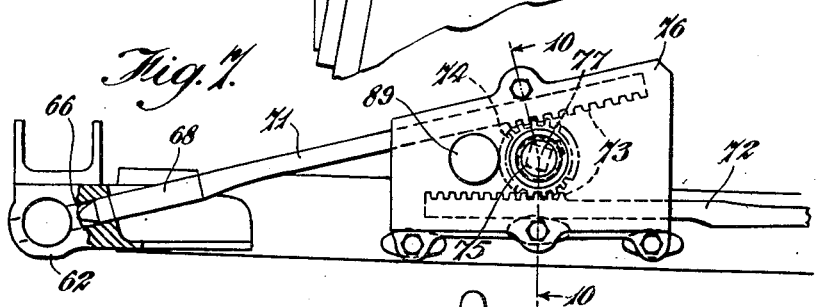

Dec. 7, 1954     F. CROSS     2,696,143
AIRCRAFT AND GUN INSTALLATIONS THEREFOR
Filed Feb. 13, 1951     4 Sheets-Sheet 4
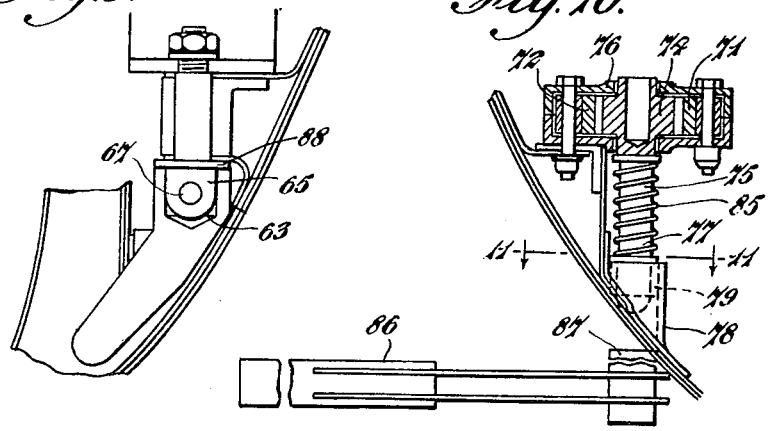
Inventor
Frank Cross
by
Stevens, Davis, Miller & Mosher
his attorneys

United States Patent Office 2,696,143
Patented Dec. 7, 1954

2,696,143

AIRCRAFT AND GUN INSTALLATIONS THEREFOR

Frank Cross, Esher, England, assignor to Hawker Aircraft Limited, Kingston-upon-Thames, England Application February 13, 1951, Serial No. 210,699

Claims priority, application Great Britain February 17, 1950

5 Claims. (Cl. 89—37.5)

This invention relates to aircraft and to gun installations therefor.

Modern military aircraft, and particularly fighter aircraft having multiple gun installations, carry a very heavy weight of ammunition, and the satisfactory reloading of the magazines is thus a considerable problem, especially as it has to be done at a high speed and under exposed conditions.

The object of the present invention is to provide aircraft with gun installations such that this problem is materially simplified, so that the aircraft can be rearmed in a very short time and the work done under much more satisfactory conditions.

According to one aspect of the invention, an aircraft is provided with a readily separable gun unit including a gun or guns and the magazine or magazines therefor, means being provided for locating the gun unit accurately in position in the aircraft and securing it rigidly in position thereon.

According to another aspect of the invention, an aircraft is provided with a readily separable gun unit including the breech portion or portions of a gun or guns and the magazine or magazines therefor but not including the gun barrel or barrels, means being provided for locating said gun unit accurately on the aircraft and securing it rigidly in position thereon, the gun barrel or barrels being adapted for connection to the breech portion or portions when the gun unit is in position.

According to another aspect of the invention, a gun unit for an aircraft comprises a frame or housing supporting at least the breech portion or portions of a gun or guns and the magazines or magazines therefor, the said frame or housing being quickly detachable from and attachable to an aircraft of which the said gun or guns form the whole or part of the armament.

The gun unit is preferably removable downwardly, and it may be accommodated in a downwardly opening cavity in the aircraft. The lower portion of the unit may form a part of the skin of the aircraft, or the cavity may be closed by hinged or sliding doors.

Access doors are preferably provided to spaces in the aircraft fore and aft of the cavity, to permit access to the gun barrels and to spent ammunition chutes.

The invention is hereinafter described with reference to the accompanying drawings, in which:

Figure 1 is a partial side elevation of an aircraft showing a gun unit positioned ready for lifting into position thereon;

Figure 2 is a front elevation of the aircraft shown in Figure 1, the fuselage being shown in section on the line 2—2 of Figure 1;

Figure 3 is a sectional side elevation of a gun unit, with the gun barrels fitted thereto, the unit being in position in an aircraft, part of which is indicated in chain-dotted lines;

Figure 4 is a plan view, on a larger scale, of the unit shown in Figure 3;

Figure 5 is a rear view of the gun unit, on the same scale as Figure 3;

Figure 6 is a detail showing an arrangement for adjusting the guns in the unit;

Figure 7 is a detail, on an enlarged scale, of part of Figure 4, showing the operating mechanism for the latch bolts which secure the gun unit in the aircraft;

Figure 8 is a side elevation of the parts shown in Figure 7;

Figure 9 is a transverse section on the line 9—9 of Figure 4, on an enlarged scale;

Figure 10 is a transverse section on the line 10—10 of Figure 7;

Figure 11 is a sectional plan on the line 11—11 of Figure 10;

Figure 12 is a side view of an outboard spent ammunition chute, the view being mainly in section on the line 12—12 of Figure 5; and Figure 13 is a view similar to Figure 12 of an inboard ammunition chute, being mainly in section on the line 13—13 of Figure 5.

The drawings illustrate the application of the invention to a fighter aircraft having its armament concentrated in the fuselage. Referring to Figures 1 and 2, the aircraft fuselage is shown at 20, and the wings at 21, 21. A cavity is provided in the belly of the aircraft, the cavity having a lower portion 22 which extends fore and aft beyond its upper portion 23, the front and rear portions of the lower portion of the cavity being closed by hinged access doors 24 and 25 so mounted as to be readily detachable at their hinges. The intermediate portion of the cavity is closed by a gun unit 26 which fits upwardly into the cavity, the lower surface of the gun unit being shaped to conform with the belly of the aircraft.

As shown in Figures 3, 4 and 5 the gun unit 26 comprises a frame in the form of a substantially closed housing accommodating the breech portions of four guns 27, 28, 29 and 31, the outboard guns 27 and 31 being mounted somewhat above and behind the inboard guns 28 and 29. A magazine group 32 projects upwardly from the housing and includes four separate magazines 33, 34, 35 and 36, one for each gun, each magazine being connected to the appropriate gun by a cartridge feed tube 37.

Each gun is mounted at its forward end in a spherical bearing 38 in the frame of the unit, and is supported at its rear end by a device 39 allowing for slight adjustment both vertically and laterally, so that the relation of the line of fire of the four guns can be adjusted. One of the rear end supporting devices is shown in detail in Figure 6, the vertical adjustment being provided by an eccentric sleeve 41 mounted in a block 42 supported in the gun unit, the eccentric sleeve having through it a pin 43 extending between the arms of a bracket 44 fixed to the gun. The block 42 is mounted on a screw threaded rod 45 rotatable in a bracket 46 fixed to the gun unit frame, the rod 45 being rotatable to move the rear end of the gun from side to side, and the gun being clamped in any position to which it is adjusted, by an externally screw threaded sleeve 47 surrounding the rod 45 and screwing into one arm of the bracket 46, the sleeve being screwed tight against the end of the block to effect the clamping.

The gun barrels 48 extend at their forward ends into blast tubes 49, Figure 3, and are connected to the breech portions by quick-release fastenings of known type, indicated at 51.

Each gun has a spent cartridge chute connected to its rear end, the chutes leading to openings in the rear access doors 25. The spent cartridge chutes 52 for the outboard guns fit at their forward ends on tubular projections 53 projecting rearwardly from the guns, as shown in Figure 12, and have welded to their rear ends arms 54 adapted to be secured by pins 55 to brackets 56 fixed to the fuselage on the back wall of the cavity. The chutes 52 are thus accessible when the rear access doors 25 are open, and can be removed by removing the pins 55, sliding the chutes backwardly to clear the tubular projections 53, and then moving them downwardly. The spent cartridge chutes 57 for the inboard guns, see Figure 13, comprise portions 58 which fit over tubular projections 59 at the rear ends of the guns, and remain normally in position in the gun unit, and removable portions 61 similar to the chutes 52 for the outboard guns, the portions 61 being supported by brackets 62 in the fuselage and being removable in the same manner as the chutes 52.

The gun unit is located in the aircraft by locating means comprising locating pins co-operating with socket members, and is held in position by latch bolts or pins passing transversely through the locating pins, means being provided for engaging and disengaging a number of such latch bolts simultaneously. The locating and securing means will now be described with reference to Figures 4, 5, 7, 8, 9, 10 and 11 of the drawings.

Referring to Figure 4, three sockets 62, 63 and 64 are provided along each side of the gun unit, just inside the skin of the unit, the sockets being rigidly secured to the frame of the unit. A corresponding number of locating pins are mounted on the aircraft fuselage along the sides of the cavity therein, each locating pin being rigidly secured to the structural members of the fuselage. One of these locating pins is shown at 65 in Figure 9. The sockets are provided with transverse holes such as that shown in dotted lines at 66 in Figures 7 and 8, and the locating pins are provided with diametral holes 67, Figure 9, which come into alignment with the holes 66 when the locating pins enter the sockets. Latch means for retaining the pins in the sockets comprises latch bolts 68, 69 and 70 associated with the sockets 62, 63 and 64 respectively, the latch bolts sliding in the holes 66 so that they can be projected into the holes 67 in the locating pins when the latter are engaged in the sockets. The latch bolt 68 on each side of the gun unit is formed on one end of a bar 71, and the latch bolts 69 and 70 on each side of the unit are attached to a bar 72, the bars 71 and 72 each having a portion formed with rack teeth 73, Figure 7, meshing with a pinion 74 mounted on a vertical shaft 75. The pins 69 and 70 are provided with guides 80. The rack portions of the bars 71 and 72 are guided for sliding movement in a housing 76 provided with bearings for the shaft 75. The bars 71 and 72 and the pinion 74 together constitute a linkage connecting the latch bolts 68, 69 and 70. The shaft 75 has a square portion 77 projecting into a socket 78, a sleeve 79 slidable in the socket being square internally to fit on the shaft, and being formed with a key 81 adapted to enter either one of two keyways 82 and 83 in the socket. An ear 84 at the upper end of the key limits downward movement of the sleeve 79 by engaging the upper surface of the socket 78, the sleeve being urged downwardly by a spring 85. The key 81 therefore enters one or other of the keyways 82 and 83 when the sleeve 79 is suitably positioned in the socket 78, and prevents rotation of the shaft 75. The key and keyways thus constitute stop means for preventing rotation of the shaft. A removable handle 86, Figure 10, is provided for rotating the shaft 75, the handle having a plug member 87 with a square hole therein, the plug member fitting upwardly into the socket 78, and engaging the squared portion of the shaft.

The plug member 87 of the handle constitutes means for releasing the stop means above referred to, insertion of the plug member 87 of the handle in the socket 78 lifting the sleeve 79 until the key 81 is clear of the socket, and the shaft can then be rotated until the key is opposite the other key-way, when the sleeve can again move downwardly into the socket. The plug member of the handle 86 is formed with an ear (not shown) which co-operates with the keyways 82 and 83 so that the handle can be inserted and removed only with this ear aligned with one of the keyways, and must be pushed upwardly to a position in which the ear is above the upper end of the socket 78 before the shaft can be turned. As the keyways 82 and 83 are so positioned that the angle between them is equal to the angular movement necessary to project or withdraw the pins, the handle can be removed only when the pins are either fully engaged or fully released.

The locating pins 65 carry washers 88 limiting their entry into the sockets on the gun unit, and thus positioning the latter unit vertically with respect to the fuselage. Each housing 76 carries a vertical peg 89 (Figure 8) which enters a suitable socket (not shown) in the fuselage to provide an initial location for the gun unit.

It will be seen that the position of the locating pin and socket members in relation to the axes of the guns is such that the recoil forces of the guns act parallel and close to a plane passing through all the sockets at the centre of their length.

The gun unit may be raised into position in the aircraft, and lowered for removal, by means of three detachable winches secured to suitable attachment members on the aircraft. Two of these winches are shown at 90, 90 in Figure 2, these winches being connected to a sling 91 passing underneath the front end of the unit. The winch 92 is connected to the front end of the unit. The gun units may be conveyed to and from the aircraft on wheeled trolleys such as that shown at 93 in Figures 1 and 2.

In order to remove a gun unit 26 of which the magazines have been emptied, and to replace it by another, a trolley such as 93 is positioned underneath the aircraft, the access doors 24 and 25 are opened, and the winches 90, 90, 92 are attached to the aircraft, lifting cables of the winches 90, 90 being attached to the sling 91 and the cable of the winch 92 being connected to a suitable point at the front of the gun unit. The gun barrels 48 are disconnected from the breech units of the guns, the connections 51 being readily reached when the front access doors 24 are open, and the spent ammunition chutes 52, 57 are removed in the manner described above. The electrical or other connections to the guns for controlling the firing are also disconnected, being accessible when the doors 25 are open.

The handle 86 is next inserted in one of the sockets 78 and turned to release the latch bolts 68, 69 and 70 at one side of the gun unit, and is then removed, the handle then being inserted in the other socket 78 to release the latch bolts 68, 69 and 70 on the other side. The gun unit 26 is then free, and is lowered by means of the winches onto the trolley, on which it is wheeled away after releasing the winch cables. A fresh gun unit is then brought up on a trolley, and lifted into position after attachment of the winch cables thereto. When the gun unit is in position the latch bolts are moved to the locking position and the gun barrels, spent ammunition chutes and firing controls are connected up. The aircraft is thus re-armed and after removal of the winches and closing of the access doors is again in condition for flight.

The guns of the gun unit can be adjusted and tested for concentration of fire whilst the unit is out of the aircraft.

In the arrangement described above the under-surface of the gun unit is provided with skin means forming a part of the aircraft skin, but instead the cavity may be closed by hinged or sliding doors after the unit has been secured in position, and such doors may extend far enough beyond the ends of the unit to avoid the need for separate access doors. Means other than bomb hoists attachable to the aircraft may be provided for raising and lowering the unit.

The arrangement according to the invention enables the loading and servicing of the guns to be carried out away from the aircraft, for example in an armoury where adequate provision can be made for efficient working, and the equipment can be protected from dust and the elements. A gun unit can be removed and replaced in another in a far shorter time than would be needed to service and reload guns fixed in the aircraft, and thus the time during which an aircraft is grounded for re-arming is materially shortened.

The gun unit may include any number of guns of any desired calibre, which may constitute the whole, or only a part of, the armament of an aircraft.

I claim:

1. An aircraft having a fuselage in which is provided a downwardly opening cavity, a gun unit fitting upwardly into said cavity, said gun unit comprising a frame, a plurality of guns mounted parallel one to another in said frame, and an ammunition magazine for each said gun also mounted in said frame, downwardly projecting locating pins fixed to said aircraft and socket members on said gun unit to receive said pins, the axes of said pin and socket members being substantially perpendicular to the line of fire of the guns, and latch bolt mechanism carried by said gun unit, said mechanism comprising latch bolts sliding in holes in the socket members transverse to the axes of said socket members, said latch bolts passing through holes in the pins to retain them in the sockets.

2. An aircraft according to claim 1, wherein the latch bolt mechanism comprises linkage connecting a plurality of said latch bolts for simultaneous sliding movement and means operating on the linkage to effect said sliding movement.

3. An aircraft according to claim 2 wherein the latch bolt mechanism further comprises a rack coupled to said linkage, a pinion engaging said rack, a shaft carrying said pinion, a removable handle adapted to engage and rotate said shaft, stop means for preventing rotation of said shaft, and means on said removable handle for releasing said stop means when the handle is fitted to said shaft.

4. An aircraft according to claim 3 wherein a fixed socket surrounds said shaft, and an ear on said removable handle co-operates with keyways in said fixed socket, the movement of said handle to its operative position on said shaft necessitating the passage of the ear through one of said keyways and the keyways being so positioned that the ear is aligned with one of them only when the latch bolts are fully engaged or fully released.

5. In an aircraft having a fuselage and a gun installation comprising a plurality of guns mounted in fixed relation to the aircraft in a group in said fuselage, a frame carrying the guns and ammunition magazines therefor, detachable gun barrels projecting forwardly from said frame within said fuselage, detachable spent ammunition chutes projecting rearwardly from said frame within said fuselage, a downwardly opening cavity in the fuselage to receive said frame, skin means on said frame to completely close said cavity, access doors in said fuselage in front of and behind said cavity, co-operating locating means on said frame and said aircraft to locate said frame both horizontally and vertically in said cavity, said locating means being engageable by vertical upward movement of said frame into said cavity, latch means associated with said locating means to hold said frame in position in said aircraft, and means operable from the exterior of said aircraft when the frame is in position in the fuselage for operating all of said latch means.

References Cited in the file of this patent

UNITED STATES PATENTS

| Number | Name | Date |
|---|---|---|
| 2,137,577 | Lobelle et al. | Nov. 22, 1938 |
| 2,331,033 | La Porte | Oct. 5, 1943 |
| 2,372,728 | Martin | Apr. 3, 1945 |
| 2,444,300 | Kuska | June 29, 1948 |
| 2,559,727 | Meyer | July 10, 1951 |

FOREIGN PATENTS

| Number | Country | Date |
|---|---|---|
| 578,548 | Great Britain | July 3, 1946 |